United States Patent
Idensjö

(10) Patent No.: US 6,772,787 B2
(45) Date of Patent: Aug. 10, 2004

(54) VACUUM REGULATOR FOR MAINTAINING A SUBSTANTIALLY CONSTANT VACUUM IN A VACUUM SYSTEM

(76) Inventor: Henrik Idensjö, Myntstigen 14, Södertälje (SE)

( * ) Notice: Subject to any disclaimer, the term of this patent is extended or adjusted under 35 U.S.C. 154(b) by 0 days.

(21) Appl. No.: 10/380,076

(22) PCT Filed: Sep. 6, 2001

(86) PCT No.: PCT/SE01/01902
§ 371 (c)(1),
(2), (4) Date: Mar. 6, 2003

(87) PCT Pub. No.: WO02/19804
PCT Pub. Date: Mar. 14, 2002

(65) Prior Publication Data
US 2003/0150491 A1 Aug. 14, 2003

(30) Foreign Application Priority Data
Sep. 6, 2000 (SE) .............................................. 0003150

(51) Int. Cl.⁷ ............................ G05D 16/16; A01J 5/04
(52) U.S. Cl. ....................... 137/489; 137/509; 137/907; 119/14.44
(58) Field of Search ................................ 137/488, 489, 137/509, 907; 251/333; 119/14.44

(56) References Cited

U.S. PATENT DOCUMENTS

| 4,605,040 A | * | 8/1986 | Meermoller ................ 137/489 |
| 4,944,249 A | | 7/1990 | Takeuchi et al. |
| 4,955,408 A | | 9/1990 | Meermoller |
| 5,284,180 A | | 2/1994 | Gue et al. |

FOREIGN PATENT DOCUMENTS

| EP | 0 017 493 | 4/1980 |
| SE | 502210 | 9/1995 |

* cited by examiner

Primary Examiner—Ramesh Krishnamurthy
(74) Attorney, Agent, or Firm—Hovey Williams LLP

(57) ABSTRACT

The invention relates to a vacuum regulator (1) for maintaining a substantially constant vacuum in a vacuum system (2). The vacuum regulator (1) includes a main valve arranged to control a supply of air to the vacuum system (2). The main valve includes a valve seat (3) defining a passage (4) arranged to lead air to the vacuum system (2) and a valve body (5) moveably arranged in a direction between a closed position and a maximally open position in order to regulate the size of a minimum flow area (18) between the valve seat (3) and the valve body (5). A force (19) caused by the vacuum acts on the valve body (5) in a direction towards the closed position. The valve seat (3) and the valve body (5) have such a design, that the value of the force (19), in a continuous way, increases with the degree of opening of the valve body (5).

20 Claims, 2 Drawing Sheets

VACUUM REGULATOR FOR MAINTAINING A SUBSTANTIALLY CONSTANT VACUUM IN A VACUUM SYSTEM

THE BACKGROUND OF THE INVENTION AND PRIOR ART

The present invention relates to a vacuum regulator for maintaining a substantially constant vacuum in a vacuum system, wherein the vacuum regulator comprises a main valve arranged to control a supply of air to the vacuum system, wherein the main valve comprises a valve seat defining an passage arranged to lead air to the vacuum system and a valve body moveably arranged in a direction between a closed position and a maximally open position in order to regulate the size of a minimum flow area between the valve seat and the valve body and wherein a force caused by the vacuum acts on the valve body in a direction towards the closed position In vacuum systems used in connection with milking machines, it is important to maintain a desired constant vacuum in the vacuum system. In order to remove the air leaking into the system, a vacuum pump is connected to the vacuum system having a capacity to maintain more than the desired vacuum level in the system. A vacuum regulator is also connected to the vacuum system to supply air to the vacuum system in such a quantity that the vacuum in the system is maintained at the desired vacuum level.

Usually, a conventional vacuum regulator comprises a main valve comprising a valve seat defining a passage arranged to lead air to the vacuum system and a valve cone arranged to control the airflow through the passage. An increased degree of opening of the valve cone results in a corresponding increase of the airflow through the passage between the valve cone and the valve seat to the vacuum system. The vacuum in the vacuum system provides a force acting on the valve cone towards a closed position. The value of this force depends on the vacuum level and the size of an active area of the valve cone exposed to the vacuum. An increased degree of opening of the valve cone results in an increased airflow and an increased vacuum acting on the valve cone. That has a positive effect on the force. The active area of a conventional valve cone decreases with an increased degree of opening of the valve cone. The decreased area has usually a greater negative effect on the value of the force than the positive effect of the increased airflow. Consequently, the value of the force acting on the valve cone may decrease or fluctuate in relation to the degree of opening of the valve cone. Thereby, it is difficult to set the valve cone in a desired arbitrary position with a high precision. Consequently, it is difficult to establish a stable control of the airflow to the vacuum system.

EP 0 017 493 discloses a vacuum regulator comprising a main valve arranged to supply air at a controlled rate to a vacuum system. In this case, a spring is arranged to act on a diaphragm connected to a valve member of the main valve. By means of the spring, the valve member is forced by an additional force against the closed position. The arrangement of the spring provides an improved stability of the valve member during the supply of air to the vacuum system.

SUMMARY OF THE INVENTION

The object of the present invention is to provide a vacuum regulator of the initial kind, having a valve member with a valve seat and a valve body having such design that a simple and stable control of the airflow to the vacuum system is obtained.

This object is achieved in that the valve seat and the valve body have such design, that the value of said force increases, in a continuous way, with the degree of opening of the valve body. Thereby, it is possible to create a stable positioning of the valve body in a substantially arbitrary position. The quantity of air supplied to the vacuum system may be regulated with a high precision, which results in a stable and rapid control of the airflow to the vacuum system.

According to a preferred embodiment of the invention, the minimum flow area is determined by a part of the valve body. The active area of the valve body on which the vacuum acts is located at the minimum flow area of the passage. By a suitable design of the valve body and the valve seat, the active area is steadily located at said part of the valve body. Thereby, the active area is constant independent of the position of the valve body. Consequently, the active area of the valve body does not decrease with an increased degree of opening of the valve body, and the value of the force is not negatively influenced. Preferably, the largest radial cross section area of the valve body defines said part of the valve body. Thereby, a maximally active area of the valve body is utilised. Advantageously, said part of the valve body is arranged to be located radially inside the valve seat independent of the position of the valve body. Thereby, the valve seat has at least an extension corresponding to the distance between the closed and maximally open position of the valve body. By such a valve seat construction, the location of the minimum flow area to said part of the valve body is facilitated. Preferably, the size of the minimum flow area increases in a continuous way with the degree of opening of the valve body. Thereby, the airflow increases with the degree of opening of the valve body. The increased airflow results in an increased vacuum acting on the valve body. Thus, it is guaranteed that the value of the force acting on the valve body increases with the degree of opening of the valve body.

According to a further embodiment of the invention, the surface of the valve seat defines a tapering hole. Such a hole has an increased cross section area, in a continuous way, toward an inlet of the passage of valve seat. Consequently, the minimum flow area between the valve seat and valve body increases when the valve body moves towards an increased degree of opening. Advantageously, the valve body has a tapering shape. A tapered valve body provides a simple airtight connection to the valve seat. Furthermore, such a valve body provides a centering of the valve body in relation to the valve seat. The valve body may have a shape as a cone or a frustum of a cone. Preferably, the valve body is movable in an axial direction in relation to the valve seat. Thereby, the valve body is movable along a straight line, which facilitates the control of the valve body.

According to a further embodiment of the invention, the vacuum regulator comprises control means arranged to control the movement of the valve body. Such control means may control the movement of the valve body depending on the actual vacuum in the vacuum system and a desired vacuum level in the vacuum system. If the actual vacuum in the vacuum system increases, the control means initiates a displacement of the valve body from the closed position to an open position, and thus air is supplied to the vacuum system. The degree of opening of the valve body may be regulated in relation to the difference between the actual vacuum and the desired vacuum.

According to a further embodiment of the invention, such a control means may comprise a first diaphragm arranged between a first chamber connected to the atmospheric pressure and a second chamber connected to a control pressure.

The diaphragm is moved against the second chamber if the control pressure is lower than the atmospheric pressure. The position of the diaphragm is related to the difference between the control pressure and the atmospheric pressure. The valve body obtains, by the connection to the diaphragm, a corresponding position by means of the control pressure. A pilot valve may be arranged to regulate the control pressure in the second chamber. Such a pilot valve may be connected to a second diaphragm arranged between a third chamber connected to atmospheric pressure and a fourth chamber connected to a signal pressure related to the actual vacuum in the vacuum system. If the actual vacuum in the vacuum system increases in relation to the desired vacuum, the diaphragm moves the pilot valve to a closed position. In the closed position, the pilot valve prevents an airflow to the second chamber. Since, for example, a small conduit connects the second chamber to the vacuum the control pressure in the second chamber is gradually reduced. The reduced control pressure results in an opening of the valve body and supply of air to the vacuum system. The supply of air to the vacuum system proceeds until the pressure in the vacuum system reaches the desired vacuum. When the desired vacuum is reached the pilot valve opens and air of atmospheric pressure is supplied to the second chamber and the valve body moves to the closed position. Preferably, the vacuum regulator comprises adjusting means arranged to enable adjustment of the desired vacuum level in the vacuum system. Such an adjusting means may comprise a compression spring, which is connected to the second diaphragm and arranged to compensate for the pressure difference between the third chamber having atmospheric pressure and the fourth chamber having the actual vacuum. The adjusting means may also comprise a tension mechanism arranged to adjust the prestressing of the spring. The adjusting means makes it is possible to adjust the vacuum in the vacuum system to a desired vacuum level.

BRIEF DESCRIPTION OF THE DRAWINGS

The present invention is now to be explained more closely by means of a preferred embodiment, which is disclosed as an example, and with reference to the attached drawings.

DETAILED DESCRIPTION OF PREFERRED EMBODIMENTS OF THE INVENTION

Figure 1:
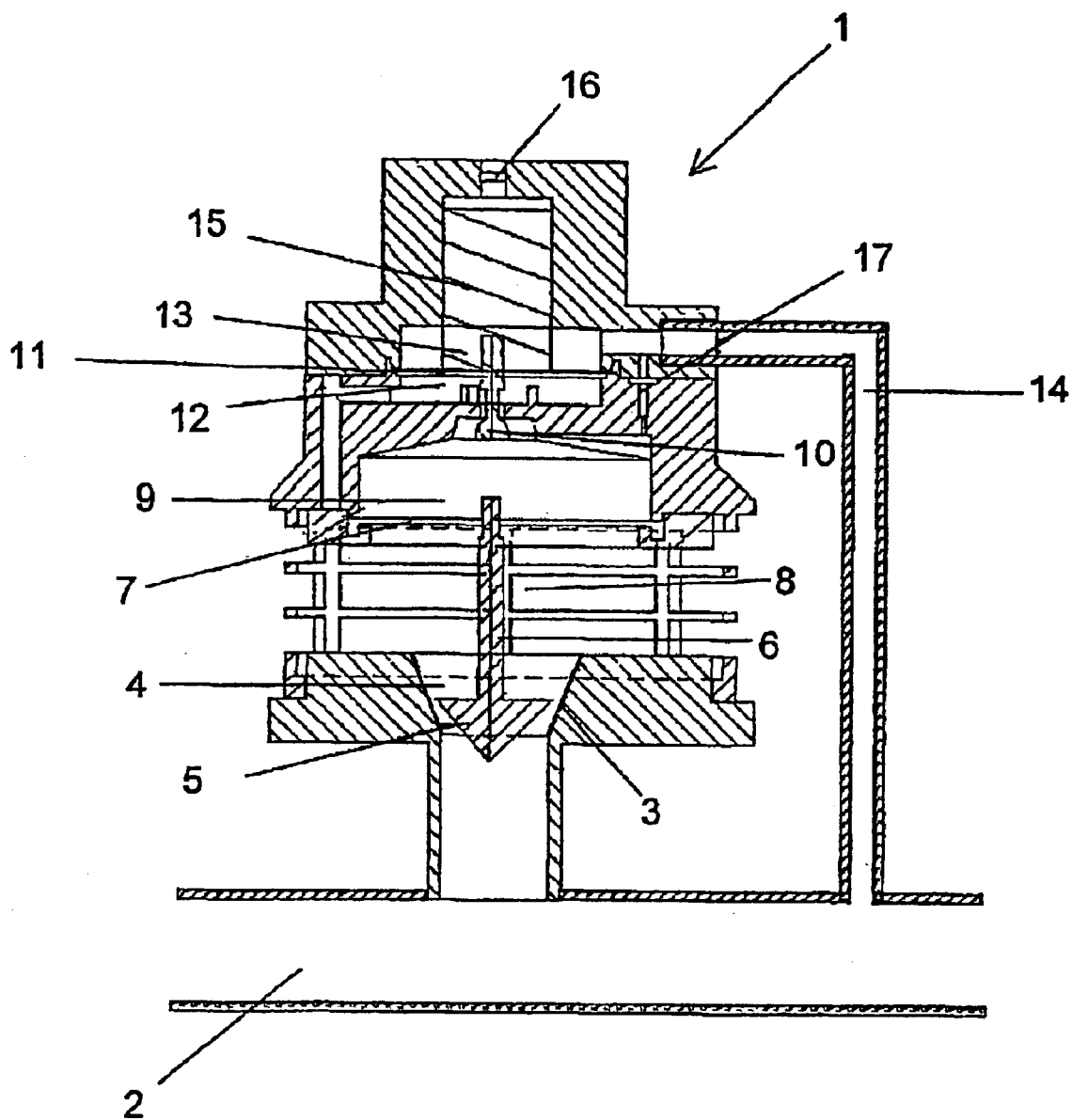
FIG. 1 shows a vacuum regulator according to the invention.

FIG. 1 shows a vacuum regulator 1. The vacuum regulator 1 is arranged to maintain a substantially constant vacuum level in a vacuum system comprising a vacuum pipe 2. Preferably, the vacuum in the vacuum pipe 2 is used in connection with a milking machine. In such vacuum systems, it is important to maintain a constant vacuum level. In order to remove the air leaking into the vacuum system, a vacuum pump is connected to the vacuum system. Such a vacuum pump must have capacity to maintain a higher vacuum in the vacuum system than the desired vacuum level The vacuum regulator 1 is connected to the vacuum system in order to supply air to the vacuum pipe 2 in such a quantity that the vacuum in the vacuum pipe 2 is maintained at the desired vacuum level.

The vacuum regulator 1 comprises a main valve arranged to control the supply of air to the vacuum pipe 2. The main valve comprises a valve seat 3, having a surface defining a tapering hole 4 arranged to lead air to the vacuum pipe 2, and a valve body 5 having a conical shape. The valve body 5 is, via a stem 6, connected to a centre part of a first diaphragm 7. The first diaphragm 7 is arranged between a first chamber 8 having atmospheric pressure and a second chamber 9 having a control pressure. A pilot valve 10 regulates the value of the control pressure. The pilot valve 10 is connected to a second diaphragm 11. The second diaphragm 11 is arranged between a third chamber 12 having atmospheric pressure and a fourth chamber 13 having a signal pressure. A signal pipe 14 connects the fourth chamber 13 to the vacuum pipe 2. Therefore, the signal pressure is identical with the actual vacuum in the vacuum pipe 2. A spring 15 acts on the second diaphragm 11. The spring-tension of the spring 15 is arranged to compensate for the pressure difference between the vacuum in the fourth chamber 13 and the atmospheric pressure in the third chamber 12 when the actual vacuum corresponds to the desired vacuum level. An adjusting screw 16 is provided at the top of the spring 15. The adjusting screw 16 enables a variable adjustment of the prestressing of the spring 15 and thereby an adjustment of the desired vacuum level in the vacuum system.

When the vacuum level in the vacuum pipe 2 is too high in relation to the desired level, the signal pressure in the fourth chamber 13 decreases in a corresponding manner. The decreased signal pressure in the fourth chamber 13 initiates movement of the second diaphragm 11 in an upward direction against the spring-tension of the spring 15. At the same time, the second diaphragm 11 displaces the pilot valve 10 to a closed position. The pilot valve 10 closes the air supply to the second chamber 9 from the third chamber 12 having atmospheric pressure. A small conduit 17 connects the second chamber 9 to the signal pipe 14 connected to the vacuum. Consequently, when the pilot valve 10 is in a closed position the control pressure in the second chamber 9 decreases and the first diaphragm 7 moves in an upward direction. At the same time, the first diaphragm 7 displaces, via the stem 6, the valve body 5 to an open position. The degree of opening of the valve body 5 depends on the value of the control pressure in the second chamber 9. The value of the control pressure in the second chamber 9 relates to the difference between the actual vacuum and the desired level of the vacuum. The quantity of air supplied to the vacuum pipe 2 depends on the degree of opening of the valve body 5. The supply of air proceeds until the pressure in the vacuum pipe 2 reaches the desired level. The signal pressure in the chamber 13 increases during the supply of air to the vacuum pipe 2. When the signal pressure has increased to the desired vacuum level, the second diaphragm 11 moves in a downward direction. The pilot valve 10 opens and air is supplied to the second chamber 9 and the control pressure increases to the atmospheric level. The increased control pressure moves the first diaphragm 7 in a downward direction and displaces the valve body 5 to the closed position. Thereby, the supply of air to the vacuum pipe 2 is stopped. As soon as the vacuum drops again to a too low level the above-described procedure is repeated in order to maintain a substantially constant vacuum level in the vacuum pipe 2.

Figure 2A:
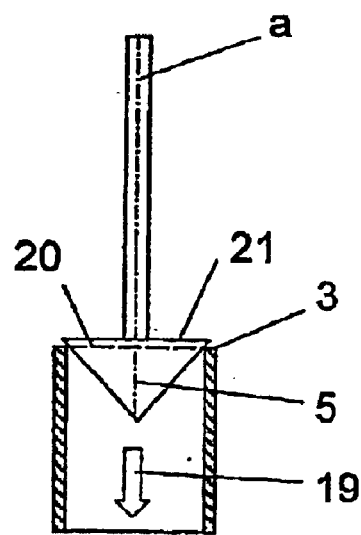
FIGS. 2a–b shows a conventional main valve in such a vacuum regulator.
Figure 2B:
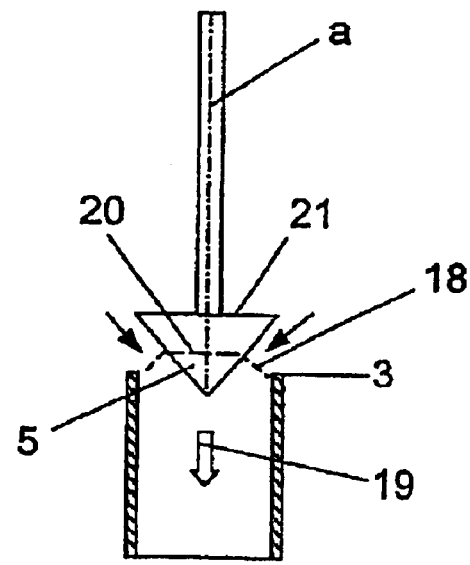

FIGS. 2a and b show a conventional main valve, used in a vacuum regulator 1. The conical valve body 5 has a centre axis a. The conical valve body 5 is, in a continuous way, moveable in an axial direction in relation to the valve seat 3 between a closed position, shown in FIG. 2a and a maximally open position, shown in FIG. 2b, by the movement of the first diaphragm 7 according to the explanation above. The quantity of air supplied to the vacuum pipe 2 is regulated by the degree of opening of the valve body 5. The degree of opening of the valve body 5 is related to the size of a minimum flow area 18 of the passage between the valve body 5 and the valve seat 3. The size of the minimum flow area 18 increases in a continuous way with the degree of opening of the valve body 5. Consequently, an increased degree of opening of the valve body 5 provides a corresponding increase of the airflow to the vacuum pipe 2. The vacuum in the vacuum pipe 2 provides a force 19 acting on the valve body 5 towards the closed position. The value of the force 19 depends on the vacuum and-the active area 20 of the valve body 5 exposed to the vacuum. The active area 20 of a valve body 5 is located at the minimum flow area between the valve body 5 and the valve seat 3. As seen in FIG. 2a–b, the active area 20 of a conventional valve body 5 decreases as the degree of opening of the valve body 5 increases. An increased air flow results in an increased vacuum acting on the valve body 5, but the increased vacuum is not enough to compensate for the decrease of the force 19 caused by the decreased active area 20. Consequently, the value of the force 19 acting on the valve body 5 may decrease or fluctuate in relation to the degree of opening of the valve body 5. Thereby, it is difficult to position the valve body 5 in an arbitrary desired position. Consequently, it is difficult to control the airflow to the vacuum system in a stable way by a conventional main valve.

Figure 3A:
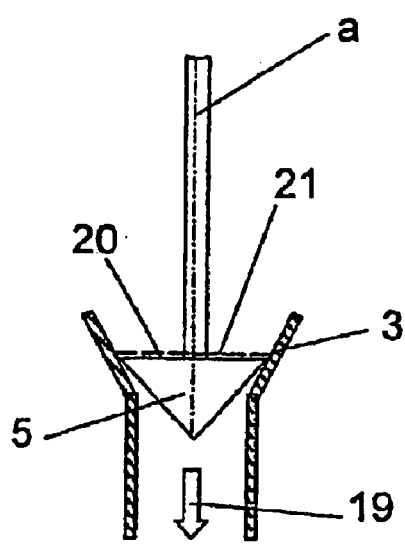
FIGS. 3a–b shows a main valve according to the invention.
Figure 3B:
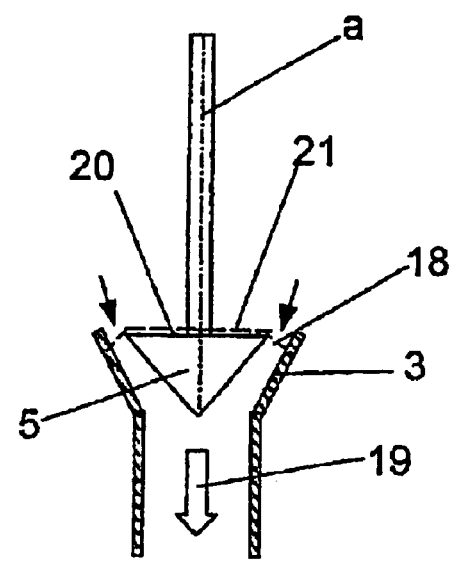

In FIGS. 3a and b shows a main valve according to the invention. The conical valve body 5 is, in a continuous way, moveable in an axial direction in relation to the valve seat 3. In this case, the surface of the valve seat 3 defines a tapering hole, which in the embodiment disclosed is substantially conical. The valve seat 3 has such an extension in an axial direction, that the largest radial cross section area 21 of the valve body 5 is located radially inside the valve seat 3 independent of the position of the valve body 5. Thereby, the minimum flow area 18 of the passage between the valve body 5 and the valve seat 3 may be located at the largest radial cross section area 21 of the valve body 5 independently of the position of the valve body 5. The active area 20 of the valve body 5, on which the vacuum acts, is located at this minimum flow area 18. Consequently, the active area 20 is, in this case, equal to the largest radial cross section area 21 of the valve body 5. Thus, the active area 21 is constant and has a maximum size independent of the position of the valve body 5. Consequently, the active area 20 of the valve body 5 will not in a negative way influence the value of the force 19 acting on the valve body 5 during an increased degree of opening of the valve body.

The surface of the valve seat 3 has such an inclination in relation to the surface of the valve body 5, that the circumference of the valve body 5 engages the valve seat in the closed position. Thereby, the radial distance between the valve body 5 and the valve seat 3 increases in a continuous way as the degree of opening of the valve body 5 and the minimum flow area 18 increases. Consequently, the airflow increases with the increased degree of opening of the valve body. The increased airflow results in higher vacuum acting on the valve body. Thereby, the value of the force acting on the valve body will increase as the degree of opening of the valve body increases.

The invention is not restricted to the described embodiment disclosed in the figures, but may be varied freely within the scope of the claims. The valve body 5 may, for example, be frusto-conical or shaped as a plate.

What is claimed is:

1. A vacuum regulator for maintaining a substantially constant vacuum in a vacuum system, wherein the vacuum regulator comprises a main valve arrange to control a supply of air to the vacuum system, wherein the main valve comprises a valve seat defining a passage arranged to lead air to the vacuum system, and a valve body arranged for movement in a direction between a closed position and a maximally open position in order to regulate the size of a minimum flow area between the valve seat and the valve body and wherein a force caused by the vacuum acts on the valve body in a direction towards the closed position, wherein the valve seat and the valve body have a design such that the value of said force increases in a continuous way with the degree of opening of the valve body.

2. A vacuum regulator according to claim 1, wherein the minimum flow area is determined by a part of the valve body.

3. A vacuum regulator according to claim 2, wherein said part of the valve body is defined by the largest radial cross section area of the valve body.

4. A vacuum regulator as set forth in claim 3, wherein said part of the valve body is arranged to be located radially inside the valve seat independent of the position of the valve body.

5. A vacuum regulator as set forth in claim 3, wherein the size of the minimum flow area increases in a continuous way in relation to the degree of opening of the valve body.

6. A vacuum regulator as set forth in claim 3, wherein the surface of the valve seat defines a tapering hole.

7. A vacuum regulator as set forth in claim 6, wherein the valve body has a tapering shape.

8. A vacuum regulator as set forth in claim 7, wherein the valve body is movable in an axial direction in relation to the valve seat.

9. A vacuum regulator as set forth in claim 3, wherein the vacuum regulator comprises means for controlling the movement of the valve body.

10. A vacuum regulator according to claim 2, wherein said part of the valve body is arranged to be located radially inside the valve seat independent of the position of the valve body.

11. A vacuum regulator according to claim 1, wherein the size of the minimum flow area increases in a continuous way in relation to the degree of opening of the valve body.

12. A vacuum regulator according to claim 1, wherein the surface of the valve seat defines a tapering hole.

13. A vacuum regulator according to claim 1, wherein the valve body has a tapering shape.

14. A vacuum regulator according to claim 1, wherein the valve body is movable in an axial direction in relation to the valve seat.

15. A vacuum regulator according to claim 1, wherein the vacuum regulator comprises control means arranged to control the movement of the valve body.

16. A vacuum regulator according to claim 15, wherein the control means is arranged to control the movement of the valve body depending on the actual vacuum in the vacuum system and a desired vacuum level in the vacuum system.

17. A vacuum regulator according to claim 16, wherein the control means comprises a first diaphragm arranged between a first chamber connected to the atmospheric pressure and a second chamber connected to a control pressure.

18. A vacuum regulator according to claim 17, wherein a pilot valve is arranged to regulate the control pressure in the second chamber.

19. A vacuum regulator according to claim 18, including a third chamber connected to atmospheric pressure, a fourth chamber connected to a signal pressure related to the actual vacuum in the vacuum system and a second diaphragm connected to the pilot valve, the second diaphragm being arranged between the third chamber and the fourth chamber.

20. A vacuum regulator according to claim 16, wherein the vacuum regulator further comprises adjusting means arranged to enable adjustment of the vacuum in the vacuum system to a desired vacuum level.

* * * * *